United States Patent
Cain

(10) Patent No.: US 7,216,282 B2
(45) Date of Patent: May 8, 2007

(54) MOBILE AD-HOC NETWORK (MANET) INCLUDING FORWARD ERROR CORRECTION (FEC), INTERLEAVING, AND MULTI-ROUTE COMMUNICATION FEATURES AND RELATED METHODS

(75) Inventor: Joseph Bibb Cain, Indialantic, FL (US)

(73) Assignee: Harris Corporation, Melbourne, FL (US)

(*) Notice: Subject to any disclaimer, the term of this patent is extended or adjusted under 35 U.S.C. 154(b) by 384 days.

(21) Appl. No.: 10/369,313

(22) Filed: Feb. 19, 2003

(65) Prior Publication Data

US 2004/0160943 A1    Aug. 19, 2004

(51) Int. Cl.
*H03M 13/15* (2006.01)
*H03M 13/43* (2006.01)

(52) U.S. Cl. ............... 714/752; 714/746; 714/784

(58) Field of Classification Search .......... 714/786, 714/784, 781, 752, 746, 712, 699, 43, 18, 714/4, 2; 370/351, 242; 710/316
See application file for complete search history.

(56) References Cited

U.S. PATENT DOCUMENTS

| | | | |
|---|---|---|---|
| 4,905,233 A | 2/1990 | Cain et al. | 370/94.1 |
| 5,412,654 A | 5/1995 | Perkins | 370/94.1 |
| 5,583,562 A * | 12/1996 | Birch et al. | 725/151 |
| 5,905,712 A * | 5/1999 | Cresswell et al. | 370/238 |
| 5,987,018 A | 11/1999 | Freeburg et al. | 370/345 |
| 6,038,452 A * | 3/2000 | Strawczynski et al. | 455/446 |
| 6,097,771 A | 8/2000 | Foschini | 375/346 |
| 6,160,819 A * | 12/2000 | Partridge et al. | 370/474 |
| 6,172,990 B1 * | 1/2001 | Deb et al. | 370/474 |
| 6,304,556 B1 | 10/2001 | Haas | 370/254 |
| 6,323,788 B1 | 11/2001 | Kim et al. | 341/81 |
| 6,414,988 B1 | 7/2002 | Ling | 375/150 |

(Continued)

FOREIGN PATENT DOCUMENTS

WO    01/89139    11/2001

(Continued)

OTHER PUBLICATIONS

I. Cidon, R. Rom, and Y. Shavitt, *Multi-Path Routing Combined with Resource Reservation*, IEEE INFOCOM'97, Japan, pp. 92-100, Apr. 1997.

(Continued)

*Primary Examiner*—Guy Lamarre
*Assistant Examiner*—Dipakkumar Gandhi
(74) *Attorney, Agent, or Firm*—Allen, Dyer, Doppelt, Milbrath & Gilchrist, P.A.

(57) ABSTRACT

A mobile ad-hoc network (MANET) may include a source node, a destination node, and a plurality of intermediate nodes. The source node may establish a plurality of routes to the destination node for transferring data therebetween, where each route passes through at least one of the intermediate nodes. The source node may also encode a plurality of data packets using a forward error correction (FEC) encoding algorithm to generate error correction data for the data packets, interleave the data packets and error correction data, and distribute and send the interleaved data packets and error correction data across the routes to the destination node. Furthermore, the destination node may receive and deinterleave the interleaved data packets and error correction data. The destination node may also decode the data packets based upon the error correction data using an FEC decoding algorithm to correct compromised data packets.

51 Claims, 3 Drawing Sheets

U.S. PATENT DOCUMENTS

| | | | |
|---|---|---|---|
| 6,470,047 B1 | 10/2002 | Kleinerman et al. | 375/232 |
| 6,477,669 B1* | 11/2002 | Agarwal et al. | 714/708 |
| 2001/0034793 A1 | 10/2001 | Madruga et al. | 709/238 |
| 2004/0037320 A1* | 2/2004 | Dickson | 370/473 |
| 2004/0076222 A1* | 4/2004 | De Francesco et al. | 375/141 |

OTHER PUBLICATIONS

Moose et al., *A COFDM -based Radio for HDR LOS Networked Communications*, submitted to International Communications Conference, Vancouver, British Columbia 1999.

Ahn et al., *An Adpative FEC Algorithm for Mobile Wireless Networks*, Technical Report ISI-TR-555, USC/Information Sciences Institute, Mar. 2002.

Fontana et al., *Recent Advances in Ultra Wideband Communications Systems*, 2002 IEEE Conference on Ultra Wideband Systems and Technologies, May 2002, Baltimore, Maryland.

NovaRoam 250 Wireless Router, product brochure available at www.nova-eng.com.

Chakrabarti et al., *QoS Issues in Ad Hoc Wireless Networks*, IEEE Communications Magazine, Feb. 2001.

Chen, *Routing Support for Providing Guaranteed End-to-End Quality-of-Service*, University of Illinois at Urbana-Champaign, 1999.

Adamson, *The Multicast Dissemination Protocol* (MDP), Oct. 22, 1999, available at http://manimac.itd.nrl.navy.mil/MDP/draft-macker-rmt-mdp-01.txt.

Macker et al., The Multicast Dissemination Protocol Toolkit, Proc. IEEE MILCOM 99, Nov. 1999.

NovaRoam 900 Wireless Router, White Paper: Dynamic Routing for Mobile Networks, 2000, available at www.nova-eng.com.

Wang et al., *When Double Mobility Improves Link Performance in Ad hoc Wireless Networks*, Proceedings of Annual Virginia Tech Symposium on Wireless Personal Communicatins, pp. 31-42, 2002.

Doyle et al., *Error-Resilience in Multimedia Applications Over Ad-hoc Networks*, IEEE, 2001 IEEE International Conference on Acoustics, Speech, and Signal Processing, 2001, Proceedings (ICASSP '01), vol. 1, pp. 1457-1460, May 7, 2001.

* cited by examiner

MOBILE AD-HOC NETWORK (MANET) INCLUDING FORWARD ERROR CORRECTION (FEC), INTERLEAVING, AND MULTI-ROUTE COMMUNICATION FEATURES AND RELATED METHODS

FIELD OF THE INVENTION

The present invention relates to the field of communication networks, and, more particularly, to mobile ad-hoc wireless networks and related methods.

BACKGROUND OF THE INVENTION

Wireless networks have experienced increased development in the past decade. One of the most rapidly developing areas is mobile ad-hoc networks (MANETs). Physically, a MANET includes a number of geographically-distributed, potentially mobile nodes sharing a common radio channel. Compared with other types of networks, such as cellular networks or satellite networks, the most distinctive feature of MANETs is the lack of any fixed infrastructure. The network may be formed of mobile nodes only, and a network is created "on the fly" as the nodes transmit or come within range of each other. The network does not depend on a particular node and dynamically adjusts as some nodes join or others leave the network.

Because of these unique characteristics, routing protocols for governing data flow within MANETs are required which can adapt to frequent topology changes. Two basic categories of MANET routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and clusterhead gateway switch routing (CGSR). A hybrid protocol which uses both proactive and reactive approaches is the zone routing protocol (ZRP), which is disclosed in U.S. Pat. No. 6,304,556 to Haas.

Despite utilizing different approaches to discovering the available data routes between a source node and a destination node in a MANET, one common feature most MANET protocols share is the fact that they typically select a single, designated route from among the available routes over which the source and destination nodes then communicate. The selection of this designated route is typically based upon one or more quality of service (QoS) factors, such as the available bandwidth, delay, etc. associated with the route.

Of the many challenges of transmitting data in the dynamic MANET environment, reliability of the wireless communications links which form the routes between network nodes may be particularly problematic. One device which attempts to address link reliability problems is the NovaRoam Series 250 and 350 Wireless Routers from Nova Engineering, Inc., of Cincinnati, Ohio, which implements forward error correction (FEC) techniques to enhance communication link reliability. These routers apply FEC at the physical network layer, as is done in most conventional communications systems and networks. The FEC operates only over a single hop, that is, the decoding is done after each hop after receiving the transmission. Then, if another hop along a route is needed, the information is again encoded and again decoded upon reception by the next node.

While such devices may provide some level of improvement, they still may not provide sufficient error correction when certain events occur. For example, such events may include dropouts due to handover problems or even the loss of a route.

SUMMARY OF THE INVENTION

In view of the foregoing background, it is therefore an object of the present invention to provide a mobile ad-hoc network (MANET) and related methods with enhanced error correction features.

This and other objects, features, and advantages in accordance with the present invention are provided by a mobile ad-hoc network (MANET) which may include a source node, a destination node, and a plurality of intermediate nodes. The source node may establish a plurality of routes to the destination node for transferring data therebetween, where each route passes through at least one of the intermediate nodes. The source node may also encode a plurality of data packets using a forward error correction (FEC) encoding algorithm to generate error correction data for the data packets, interleave the data packets and error correction data, and distribute and send the interleaved data packets and error correction data across the plurality of routes to the destination node.

Furthermore, the destination node may receive the interleaved data packets and error correction data via the plurality of routes and deinterleave the data packets and error correction data. The destination node may also decode the data packets based upon the error correction data using an FEC decoding algorithm to correct compromised data packets. Accordingly, by performing FEC and distributing the interleaved data across a plurality of channels, the MANET thus allows corrupted data packets to be corrected even when one of the routes is lost, allowing transmission to continue while a new route is established, if necessary. Moreover, the additional amount of data associated with the FEC encoding may be spread across the plurality of routes, thus mitigating the increased bandwidth requirements.

More particularly, the source node may interleave the data packets in rows such that each row includes respective error correction data therefor. By way of example, the encoding FEC algorithm may be a Reed-Solomon encoding algorithm, and the error correction data may thus include a respective Reed-Solomon codeword for each row. Additionally, the source node may distribute and send the interleaved data packets and error correction data by dividing the rows thereof into a plurality of columns and sending the columns to the destination node across the plurality of routes.

Furthermore, the plurality of data packets may be transport layer data packets, for example, and the source node may distribute the interleaved transport layer data packets and error correction data by grouping the interleaved transport layer data packets and error correction data into a plurality of network layer packets. As such, the source node may generate respective network layer packet headers for each network layer packet, and the destination node may order the network layer packets for deinterleaving based upon the network layer packet headers. Similarly, the source node may also insert packet delimiters between the plurality of packets prior to encoding, and the destination node may extract the data packets following decoding based upon the packet delimiters.

In addition, the source node may interleave the data packets and error correction data based upon at least one FEC parameter, and the source node may change the at least one FEC parameter based upon a quality of service (QoS) measurement of the plurality of routes. By way of example, the source node may interleave the data packets and error correction data using at least one of block, convolutional, helical, and pseudorandom interleaving. Further, the source node may establish the plurality of routes using proactive, reactive, or hybrid MANET routing protocols, for example.

A method aspect of the invention is for communicating between a source node and a destination node in a MANET, such as the one described briefly above. The method may include establishing a plurality of routes from the source node to the destination node for transferring data therebetween, where each route passes through at least one of the intermediate nodes. Further, a plurality of data packets may be encoded at the source node using a forward error correction (FEC) encoding algorithm to generate error correction data for the data packets, and the data packets and error correction data may be interleaved at the source node.

The method may also include distributing and sending the interleaved data packets and error correction data from the source node across the plurality of routes to the destination node. The interleaved data packets and error correction data may be received at the destination node via the plurality of routes, and the data packets and error correction data may also be deinterleaved at the destination node. The method may further include decoding the data packets at the destination node based upon the error correction data using an FEC decoding algorithm to correct compromised data packets.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
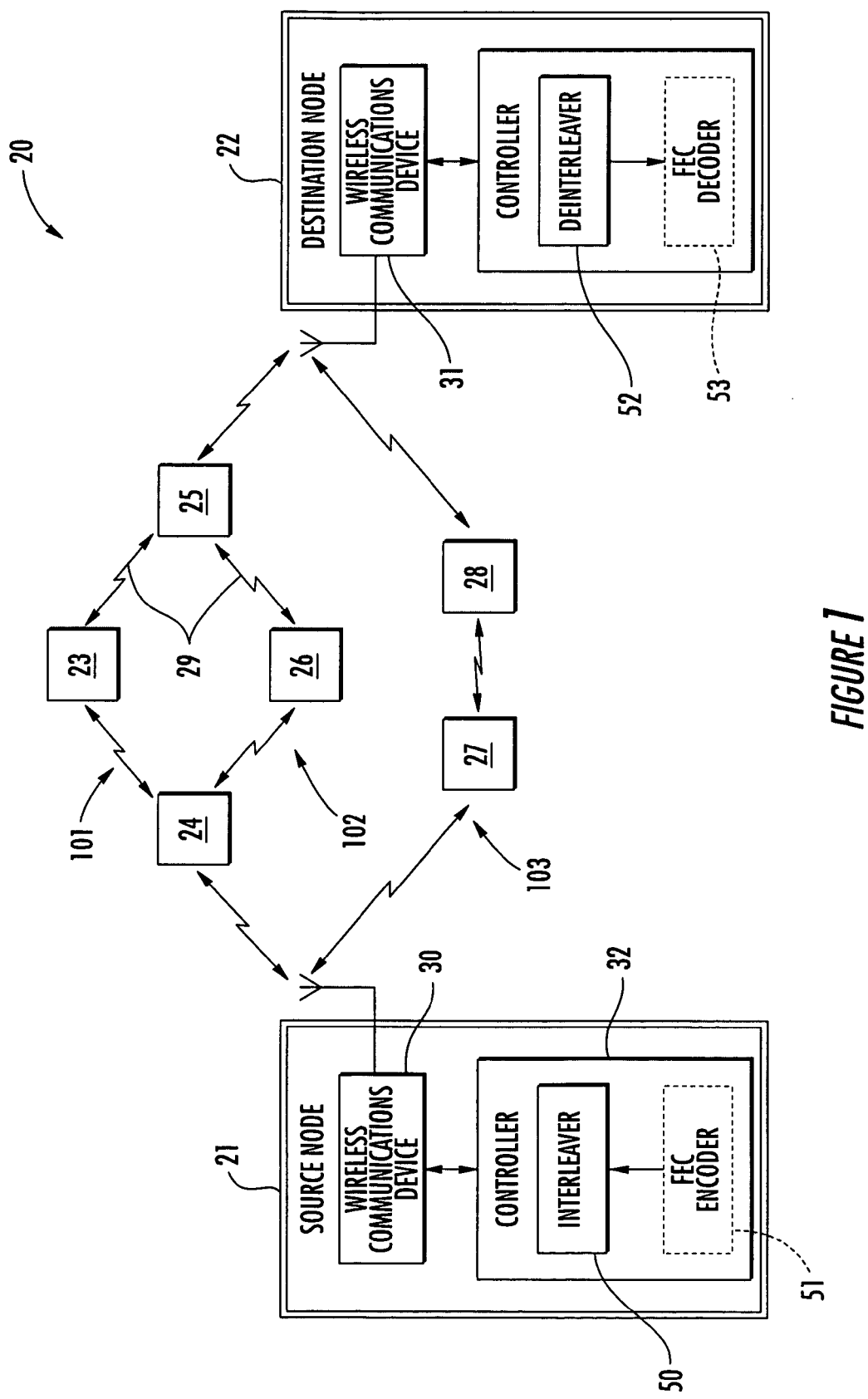
FIG. 1 is schematic block diagram of a mobile ad-hoc network (MANET) in accordance with the present invention.

Referring initially to FIG. 1, a mobile ad-hoc network (MANET) 20 includes a source node 21, a destination node 22, and a plurality of intermediate nodes 23–28 therebetween. The nodes 21–28 may be any suitable type of mobile device capable of communicating within a MANET such as computers, personal data assistants (PDAs), etc., including wireless communications devices 30, 31, for example, and other devices which will be appreciated by those of skill in the art. Of course, it will also be appreciated that certain of the nodes 21–28 may optionally be connected to a fixed communication infrastructure in some applications, if desired.

The source and destination nodes 21, 22 may further include respective controllers 32, 33 which cooperate with their respective wireless communications devices 30, 31 for sending and receiving data. In particular, the source node controller 32 illustratively includes an interleaver 50 and (optionally) an FEC encoder 51, and the destination node controller 33 includes a deinterleaver 52 and (optionally) an FEC decoder 53, the function of which will be described further below. By way of example, the source and destination node controllers 32, 33 may be implemented using microprocessors, memory, software, etc., as will be appreciated by those of skill in the art. Furthermore, the wireless communications devices 30, 31 may be wireless modems, wireless local area network (LAN) devices, cellular telephone devices, etc. It will also be understood that the intermediate nodes 23–28 preferably include suitable wireless communications devices/controllers as well, which are not shown in FIG. 1 for clarity of illustration. Of course, it will be appreciated that portions of the routes to the destination node 22 could also include wired infrastructure.

One function that the source node controller 32 performs is to establish a plurality of routes between the source node 21 and the destination node 22 for transferring data therebetween. Three such routes are illustratively shown in the exemplary embodiment, namely route 101 (passing through nodes 24, 23, and 25), route 102 (passing through nodes 24, 26, and 25), and route 103 (passing through nodes 27 and 28). Of course, any number of routes may be used in accordance with the present invention.

Each of the routes 101–103 illustratively includes respective wireless communications links 29 and pass through one or more of the intermediate nodes 23–28, as noted above. Such MANET routes can include any number of intermediate nodes therein depending upon network size and proximity between the nodes, for example. Each intermediate node along a route is typically referred to as a "hop," thus routes passing through multiple intermediate nodes are sometimes referred to as "multi-hop" routes. It should be noted that while a relatively few number of intermediate nodes 21–28 are shown in the present example for clarity of illustration, the MANET 20 in accordance with the present invention may include any number of nodes therein.

As will be appreciated by those of skill in the art, the way in which the routes 101–103 are established will depend upon the particular MANET protocol being implemented in the MANET 20. As noted above, this may be done using proactive protocols which keep routing information continuously up to date, reactive protocols which discover routes on-demand when there is a need to send data to the destination node 22, or by a combination thereof. Any suitable MANET protocols may be used which can be used to establish multiple routes, such as those previously discussed above, for example.

While MANETs are still in their relative infancy and no universal standards have as yet been adopted, data communications within MANETS will likely follow the open system interconnection (OSI) architecture or some variation thereof. This model includes seven different hierarchical control layers, namely (from highest to lowest) the application layer, presentation layer, session layer, transport layer, network layer, data link layer, and physical layer. Control is passed from one layer to the next in the sending node starting at the application layer and proceeding to the physical layer. The data is then sent across the route, and when it reaches the destination node it is processed in reverse order back up the hierarchy (i.e., from the physical layer to the application layer). Furthermore, data corresponding to each particular layer is typically organized in packets of data.

In accordance with the present invention, when the source node 21 has data packets to be sent to the destination node, the FEC encoder 51 may optionally be used to encode this data using a forward error correction (FEC) encoding algorithm. Generally speaking, with FEC data is processed prior to transmission with a predetermined algorithm that adds extra data or parity bits thereto. The parity bits are specifically designed for correcting errors in any character or code block of the associated data. Thus, if the transmission is received in error, the correction bits may be used to check and repair the data.

The source node 21 may be the originator of some or all of the data packets. That is, the source node 21 may generate the data packets, pass along data from another node, or both, as will be appreciated by those of skill in the art. Furthermore, the FEC encoder 51 may encode data packets corresponding to any of the various layers of the OSI model described above (or similar network layers corresponding to other suitable network models). Nonetheless, the present invention is particularly well suited for encoding transport layer data packets.

In particular, many wireless networks typically include some level of cyclic redundancy checking (CRC) at the data link/physical layer to detect data transmission errors. However, when channel fading, bit errors, etc., are detecting by data link/physical layer CRC, the result is typically the loss of data packets which necessitates retransmission at the data link layer, the transport layer, or the permanent loss of the packets. Yet, by encoding transport layer data packets with an FEC encoding algorithm, data link/physical layer CRC may still be used to reduce channel errors because any packet losses created thereby can be restored at the destination node 22 at higher network layers, often without the need for the time consuming retransmission of data packets.

Figure 2:
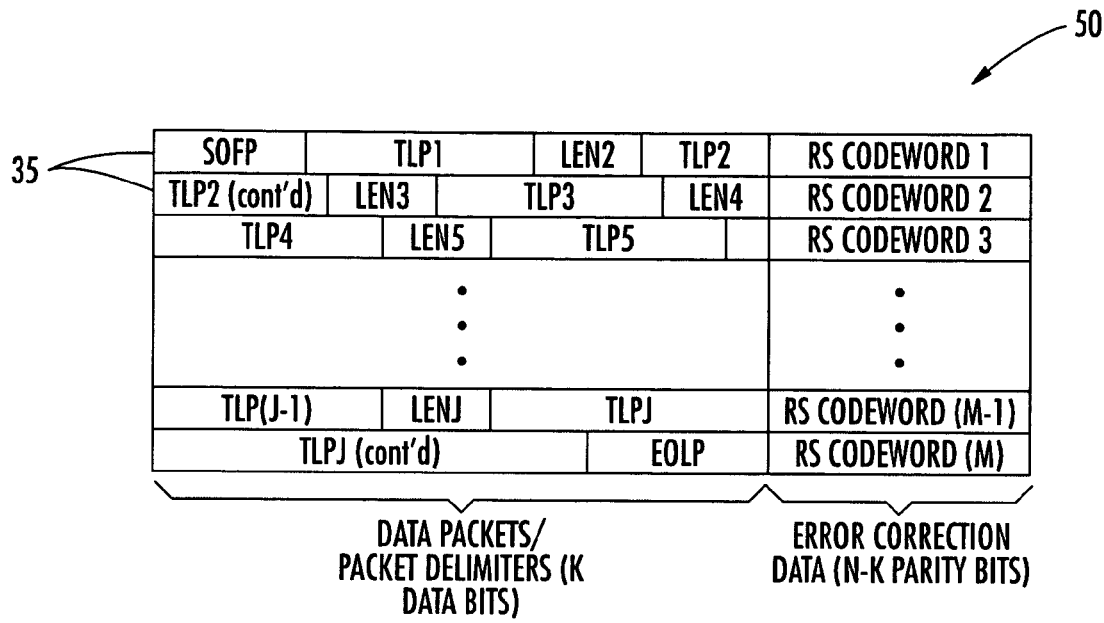
FIG. 2 is a schematic block diagram illustrating the interleaver of FIG. 1 and the interleaving of data packets, packet delimiters, and error correction data therein.

The encoding operation performed by the FEC encoder 51 will now be described in detail with reference to FIG. 2. In the illustrated example, prior to encoding the transport layer packets (labeled TLP1, TLP2, etc.), the source node controller 32 preferably inserts packet delimiters SOFP (start of first packet), LEN2 (length of second packet), EOLP (end of last packet), etc., between the transport layer packets. The packet delimiters are used in reconstructing the transport layer data packets at the destination node 22, as will be described further below.

Various FEC encoding algorithms may be used by the FEC encoder 51 to encode the transport layer data packets and, if included, the packet delimiters. One exemplary algorithm is a Reed-Solomon (RS) encoding algorithm. As will be appreciated by those skilled in the art, RS encoding is very efficient at correcting erased symbols. An RS code has K non-binary data symbols and (N–K) non-binary parity symbols (i.e., N is the total of the length K of the data symbols plus the parity symbols generated therefor). The code rate is thus K/N, and the redundancy or overhead is (N–K)/N, as will be appreciated by those of skill in the art.

Typically, RS symbols are chosen to be m-bit symbols ($2^m$ values), in which case the code block length should satisfy the relationship $N<2^m$. Further, the RS code minimum distance is d=N–K, which allows any combination of N–K erasures in a single codeword to be corrected. In other words, this is a so-called maximum distance separable code, meaning that it can correct N–K erasures with the minimum amount of overhead of any possible code.

In the present example, the transport layer data packets and their respective packet delimiters are preferably organized into rows 35, each being N bits long. Thus, data packet and packet delimiter symbols occupy the first K bits of each row 35, and the last N–K bits of the row will be the unique RS codeword for the particular K bits of data in that row which is generated by the RS encoding algorithm. Of course, it will be appreciated by those of skill in the art that the RS codewords may be appended elsewhere in a row, or that other arrangements may be used for organizing the data so that encoding may be performed thereon.

In particular, the interleaver 50 may interleave the transport layer data packets and packet delimiters into the rows 35 as the FEC encoder 51 generates the respective RS codewords therefor, which again are interleaved at the end of the rows. Interleaving is performed to spread the effects of fades, link dropouts, packet discards due to congestion, etc., which lead to bursts of erasures, across multiple RS codewords. Any suitable type of interleaving known to those skilled in the art may be used, such as block interleaving, which is illustrated in the present example. Other exemplary types of interleaving techniques include convolutional, helical, and pseudorandom interleaving.

Figure 3:
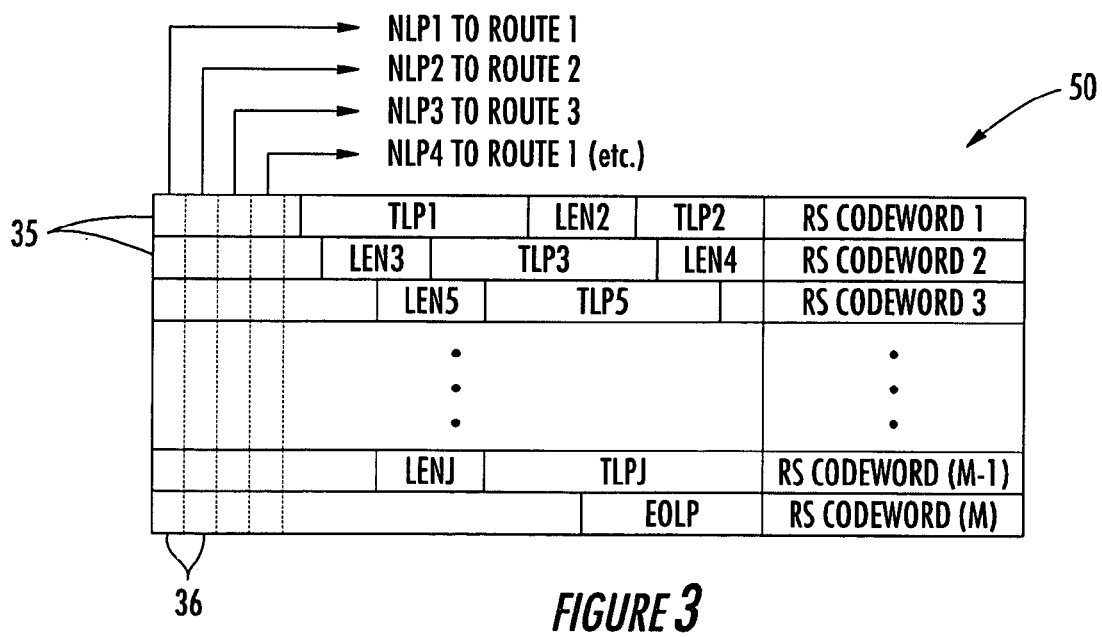
FIG. 3 is a schematic block diagram illustrating the distribution and sending of interleaved data packets, packet delimiters, and error correction data from the interleaver of FIG. 1.

Once the transport layer data packets, packet delimiters, and RS codewords have been interleaved into the rows 35, this information may then be distributed and sent to the destination node 22 via the routes 101–103. One particularly advantageous way to distribute this information is to divide the rows into a plurality of columns 36 such that each column becomes a network layer packet (NLP1, NLP2, etc.), as illustratively shown in FIG. 3. As a result, each network layer packet therefore has interleaved content from several different transport layer data packets.

Accordingly, if a network layer packet is lost during transmission, only one symbol (assuming one symbol column width) of several transport layer data packets will be lost, as opposed to each bit of all of the transport layer data packets in a row, group, etc. Of course, columns of various bit/symbol widths may be used. Even if one of the routes 101–103 is lost, only every third bit of data in each transport layer data packet will be missing, and this loss can be reconstructed at the destination node 22 based upon what remains of the RS codeword for its respective row 35, as will be described further below.

It will be appreciated that the choice of whether column width is one bit or one symbol is influenced by the nature of the error correction process of the FEC code. The RS code is a symbol error correcting code. That is, it corrects errors with a quantum of one symbol, i.e., it corrects symbol error so that it does not matter whether a single bit is in error in a symbol or whether all the bits in the symbol are in error. A column width of one bit would thus preferably be selected if the FEC code being used was a binary bit error correcting code, such as a binary convolutional code or a binary BCH code.

As with the transport layer packets, the source node controller 32 may generate respective network layer packet headers (not shown) for use by the destination node 22. By way of example, the network layer packet headers may include a stream identification (ID), a substream ID (e.g., for reserving route resources), an interleaver block sequence number, an interleaver column number, a protocol ID to indicate the requisite higher layer protocol, and/or the coding/interleaving parameters used, and/or other appropriate information for the particular MANET application in question, as will be appreciated by those skilled in the art.

When establishing the routes 101–103, the source node controller 32 will typically setup and reserve the appropriate resources for each route, as will also be appreciated by those of skill in the art. One particularly advantageous approach for establishing and sending data across multiple routes within a MANET is described in co-pending U.S. application Ser. No. 10/214,997, filed Aug. 8, 2002, which is assigned to the present Assignee, and which is hereby incorporated herein in its entirety by reference.

As noted above, as part of this route setup and reservation process the source node controller 32 may further send to the destination node 22 the particular FEC/interleaving parameters to be used (i.e., M, N, K, m, etc.). In some applications, the source and destination node controllers 32, 33 may "negotiate" which FEC/interleaving modes and parameters can be supported at each end. It should be noted that the size of the interleaving array used impacts delay, so delay constraints may need to be considered as part of the route establishment process, as will be appreciated by those skilled in the art.

From the forgoing discussion it will be appreciated that the encoding and interleaving parameters are interrelated. That is, the size of the variables N, K, etc., will not only affect encoding, but they will also govern how the transport layer packets and packet delimiters are interleaved into the rows 35. Yet, as the number of available routes or other network quality of service (QoS) metrics/measurements for one or more of the routes 101–103 vary, it may also be necessary to vary the FEC/interleaving parameters being used by the source node controller 32. This could be done in several ways. For example, in accordance with some MANET protocols the source node 21 would receive a route failure notification when a given route failed, or a poor QoS metric for a particular route could be measured by the destination node controller 33 and communicated to the source node controller 32. The source node controller 32 may then unilaterally change the new encoding/interleaving modes or parameters accordingly, or these may be negotiated with the destination node controller 33 through another hand shake procedure. Other suitable approaches known to those skilled in the art may also be used.

By way of example, if a particular route is lost, there may be a need for additional overhead, and the destination node controller 33 will thus need to be informed that the source node controller 32 has changed encoding/interleaving parameters. The new coding parameters may be indicated starting with a specified interleaver block number. That is, if there are 5 routes in use, the code rate should be 4/5 or less, and if there are only 4 routes in use then the code rate should be 3/4 or less, etc., as will be appreciated by those of skill in the art.

Once the routes 101–103 have been established and the network layer packets and headers therefor have been generated and distributed across their respective routes, the source node controller 32 cooperates with the wireless communications device 30 to then send the network layer packets/headers across their respective routes to the destination node 22. As the network layer packets are received by the destination node 22 via the routes 101–103, the respective headers included therewith indicate to the destination node controller 33 how the network layers packets should be ordered in the deinterleaver 52 for deinterleaving.

When enough network layer packets have been received in the deinterleaver 52, the reconstructed array of interleaved data may then, if necessary, be deinterleaved and decoded in the FEC decoder 52 using an FEC decoding algorithm corresponding to the FEC encoding algorithm used by the FEC decoder 51, as will be appreciated by those of skill in the art. In particular, any uncorrected bit error, fade, or link loss results in one or more discarded network packets, i.e., lost columns in the deinterleaving array, as noted above. Again, each lost column produces one erased symbol of the RS codeword (or bit of a binary bit error correcting code). Once the RS decoding fills in the erased symbols, the transport layer data packets may then be extracted based upon the packet delimiters.

Depending upon the given requirements of a particular MANET application, various design considerations may need to be balanced or otherwise taken into account when implementing the MANET 20. For example, a lower RS code rate generally produces better performance, but at the cost of more coding overhead. Similarly, greater interleaver 50 length generally also produces better performance, but at the cost of additional delay. Regarding the decoding operations at the destination node 22, the FEC decoder 52 may be implemented in hardware or software, or a combination thereof, as will be appreciated by those of skill in the art. A hardware implementation may potentially be appropriate at high data rates, as significant computational burdens could otherwise result in some applications.

Furthermore, there is also a tradeoff between the interleaver 50 size needed and the number of routes used. That is, having more routes allows some reduction in the interleaver 50 size and the delay. Yet, using numerous paths may not feasible in certain cases because such routes may not exist or simply cannot be found. Nonetheless, using more routes so that each carries a smaller portion of the total traffic stream produces greater diversity gain and better performance at a lower overhead cost, as summarized in the following table.

| Number of Paths | Maximum Code Rate Capable of Correcting Loss of a Path |
| --- | --- |
| 2 | 0.50 |
| 3 | 0.667 |
| 4 | 0.75 |
| 5 | 0.80 |
| 6 | 0.8333 |

Figure 4:
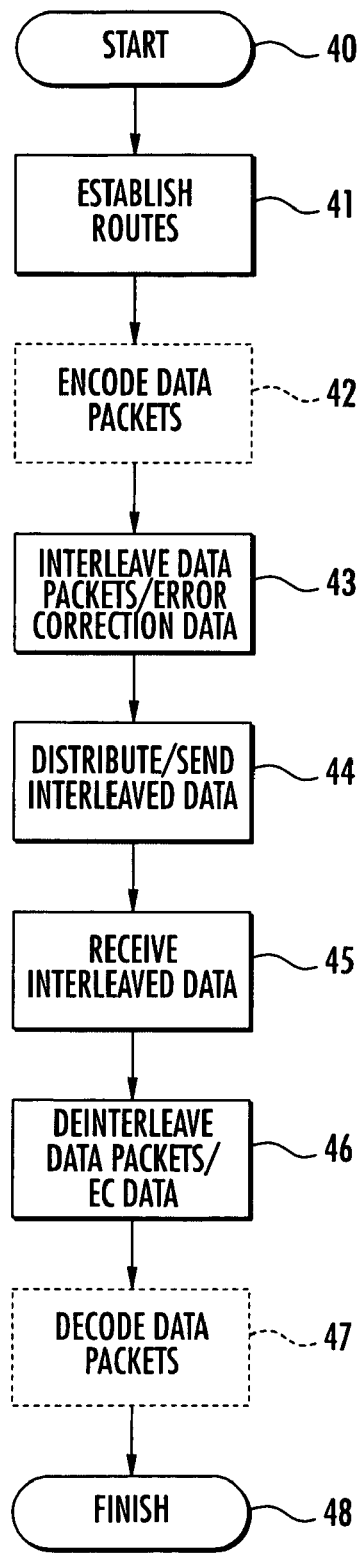
FIG. 4 is a flow diagram illustrating a method according to the present invention for communicating between a source node and a destination node in a MANET.

A method aspect of the invention for communicating between the source node 21 and the destination node 22 in the MANET 20 will now be described with reference to FIG. 4. The method begins (Block 40) with the establishment of the plurality of routes 101–103 from the source node 21 to the destination node 22, at Block 41. Further, a plurality of data packets are (optionally) encoded at the source node 21 using an FEC encoding algorithm to generate error correction data for the data packets, at Block 42, and the data packets and error correction data are also interleaved at the source node (Block 43), as previously described above.

Thereafter, the interleaved data packets and error correction data are distributed and sent from the source node 21 across the routes 101–103 to the destination node 22, at Block 44. Once the interleaved data packets and error correction data are received at the destination node 22 via the routes 101–103, at Block 45, the data packets and error correction data are then deinterleaved, at Block 46. The data packets are then decoded (if necessary), at Block 47, based upon the error correction data using an FEC decoding algorithm to correct compromised data packets, as previously described above, thus concluding the method (Block 48). Additional method aspects of the invention will be apparent to those of skill in the art based upon the forgoing description and will therefore not be discussed further herein.

It will be appreciated by those of skill in the art based upon the forgoing that, in contrast to the approach used in prior art devices such as the NovaRoam router discussed above, the present invention may advantageously apply FEC at the network layer or above. Further, decoding need not be performed upon reception by each node along a route (or path) to the destination node 22. Rather, decoding is preferably done at the destination node 22, which can perform decoding based upon information received along a multiplicity of routes from the source node 21 to the destination node. This provides for diversity not allowed by using FEC at the physical layer, as in conventional approaches.

It will be appreciated by those skilled that by performing FEC and distributing the interleaved data across a plurality of routes, the MANET 20 and methods of the present invention thus allow corrupted data packets to be corrected even when one of the routes is completely lost. This, in turn, allows transmissions to continue while a new route is established, if necessary. Moreover, even though some additional amount of overhead is associated with the inclusion of the FEC parity data, this overhead is advantageously spread across a plurality of routes, thus mitigating the increased bandwidth requirements. Furthermore, the above-described MANET and methods of the invention provide for the ready correction of packets corrupted by link errors, fades, dropouts, etc., which are very significant problems in MANETs. This provides a significant QoS advantage, especially for traffic with real-time delay requirements, which cannot tolerate retransmission of data to correct errors and dropouts.

It will also be appreciated by those of skill in the art that the invention may be implemented in numerous other network applications in addition to MANETs. By way of example, data packets could be routed through a MANET and then through a fixed infrastructure to the final destination node, or vice versa. The present invention may also advantageously be used to handle wireless local area network (WLAN) handoff from one access point to a next access point in a relatively seamless and reliable fashion to provide desired QoS. Similarly, the present invention is also particularly well suited for cellular handover between multiple base stations in a cellular network. This could help reduce cell dropouts experienced by a cell phone user which would otherwise occur when a cell phone loses its link to a single base station.

Further still, in future cell architectures "questionable" links to several different base stations could be used in accordance with the present invention to deliver reliable data to a destination, as will be appreciated by those of skill in the art. One could also implement the present invention in a fixed wireless network with unreliable links, where links are subject to severe fading and dropouts. This could dramatically improve reliability and QoS. In particular, the FEC approach outlined herein would be especially beneficial in improving QoS for real-time traffic in networks where additional delay imposed by a retransmission approach to providing packet reliability could not be tolerated. Other applications will also be appreciated by those skilled in the art based on the foregoing discussion.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network (MANET) comprising:
a source node, a destination node, and a plurality of intermediate nodes;
said source node establishing a plurality of routes to said destination node for transferring data therebetween using a MANET routing protocol, each route passing through at least one of said intermediate nodes;
said source node also
encoding a plurality of data packets using a forward error correction (FEC) encoding algorithm to generate error correction data for the data packets,
interleaving the data packets and error correction data, and
distributing and concurrently sending different portions of the interleaved data packets and error correction data across the plurality of routes to said destination node; said destination node
receiving the interleaved data packets and error correction data via the plurality of routes,
deinterleaving the data packets and error correction data, and
decoding the data packets based upon the error correction data using an FEC decoding algorithm to correct compromised data packets.

2. The EVIANET of claim 1 wherein said source node interleaves the data packets in rows such that each row includes data packets and the respective error correction data therefor.

3. The MANET of claim 2 wherein the FEC encoding algorithm comprises a Reed-Solomon encoding algorithm, and wherein the error correction data comprises a respective Reed-Solomon codeword for each row.

4. The MANET of claim 2 wherein said source node distributes and sends the interleaved data packets and error correction data by dividing the rows thereof into a plurality of columns and sending the columns to said destination node across respective routes.

5. The MANET of claim 1 wherein the plurality of data packets comprise transport layer data packets; and wherein said source node distributes the interleaved transport layer data packets and error correction data by grouping the interleaved transport layer data packets and error correction data into a plurality of network layer packets.

6. The MANET of claim 5 wherein said source node generates respective network layer packet headers for each network layer packet, and wherein said destination node orders the network layer packets for deinterleaving based upon the network layer packet headers.

7. The MANET of claim 1 wherein said source node interleaves the data packets and error correction data based upon at least one FEC parameter, and wherein said source node changes the at least one FEC parameter based upon a quality of service (QoS) measurement of the plurality of routes.

8. The MANET of claim 1 wherein said source node inserts packet delimiters between the plurality of packets prior to encoding; and wherein said destination node extracts the data packets following decoding based upon the packet delimiters.

9. The MANET of claim 1 wherein said source node interleaves the data packets and error correction data using at least one of block, convolutional, helical, and pseudorandom interleaving.

10. The MANET of claim 1 wherein the MANET routing protocol comprises a proactive MANET routing protocol.

11. The MANET of claim 1 wherein the MANET routing protocol comprises a reactive MANET routing protocol.

12. A mobile ad-hoc network (MANET) comprising:
a source node, a destination node, and a plurality of intermediate nodes;
said source node establishing a plurality of routes to said destination node for transferring data therebetween, each route passing through at least one of said intermediate nodes;
said source node also interleaving a plurality of data packets and distributing and concurrently sending different portions of the interleaved data packets across the plurality of routes to said destination node;
said destination node receiving the interleaved data packets via the plurality of routes and deinterleaving the data packets.

13. The MANET of claim 12 wherein said source node further encodes the data packets using a forward error correction (FEC) encoding algorithm to generate error correction data therefor.

14. The MANET of claim 13 wherein said source node interleaves the data packets in rows such that each row includes data packets and the respective error correction data therefor.

15. The MANET of claim 14 wherein said source node distributes and sends the interleaved data packets and error correction data by dividing the rows thereof into a plurality of columns and sending the columns to said destination node across respective routes.

16. The MANET of claim 13 wherein the FEC encoding algorithm comprises a Reed-Solomon encoding algorithm, and wherein the error correction data comprises a respective Reed-Solomon codeword for each row.

17. The MANET of claim 13 wherein said source node inserts packet delimiters between the plurality of packets prior to encoding; and wherein said destination node extracts the data packets following decoding based upon the packet delimiters.

18. The MANET of claim 12 wherein the plurality of data packets comprise transport layer data packets; and wherein said source node distributes the interleaved transport layer data packets by grouping the interleaved transport layer data packets into a plurality of network layer packets.

19. The MANET of claim 18 wherein said source node generates respective network layer packet headers for each network layer packet, and wherein said destination node orders the network layer packets for deinterleaving based upon the network layer packet headers.

20. The MANET of claim 12 wherein said source node interleaves the data packets using at least one of block, convolutional, helical, and pseudorandom interleaving.

21. The MANET of claim 12 wherein said source node establishes the plurality of routes using a proactive MANET routing protocol.

22. The MANET of claim 12 wherein said source node establishes the plurality of routes using a reactive MANET routing protocol.

23. A node for a mobile ad-hoc network (MANET) comprising:
a controller for
establishing a plurality of routes to a destination node in the MANET for transferring data therebetween, each route passing through at least one intermediate node in the MANET,
interleaving a plurality of data packets to be sent to the destination node, and
distributing different portions of the interleaved data packets across the plurality of routes; and
a wireless communications device for cooperating with said controller to concurrently send the distributed interleaved data packets across the plurality of routes to said destination node.

24. The MANET node of claim 23 wherein said controller further encodes the data packets using a forward error correction (FEC) encoding algorithm to generate error correction data therefor.

25. The MANET node of claim 24 wherein said controller interleaves the data packets in rows such that each row includes data packets and the respective error correction data therefor.

26. The MANET node of claim 25 wherein said controller distributes the interleaved data packets and error correction data by dividing the rows thereof into a plurality of columns; and wherein said controller cooperates with said wireless communications device to send the columns to the destination node across respective routes.

27. The MANET node of claim 24 wherein the FEC encoding algorithm comprises a Reed-Solomon encoding algorithm, and wherein the error correction data comprises a respective Reed-Solomon codeword for each row.

28. The MANET node of claim 24 wherein said controller inserts packet delimiters between the plurality of packets prior to encoding.

29. The MANET node of claim 23 wherein the plurality of data packets comprise transport layer data packets; and wherein said controller distributes the interleaved transport layer data packets by grouping the interleaved transport layer data packets into a plurality of network layer packets.

30. The MANET node of claim 29 wherein said controller generates respective network layer packet headers for each network layer packet.

31. The MANET node of claim 23 wherein said controller interleaves the data packets using at least one of block, convolutional, helical, and pseudorandom interleaving.

32. A network comprising:
a source node, a destination node, and a plurality of intermediate nodes;
said source node establishing a plurality of routes to said destination node for transferring data therebetween, each route passing through at least one of said intermediate nodes;
said source node also interleaving a plurality of data packets and distributing and concurrently sending different portions of the interleaved data packets across the plurality of routes to said destination node;

said destination node receiving the interleaved data packets via the plurality of routes and deinterleaving the data packets.

33. The network of claim 32 wherein said source node further encodes the data packets using a forward error correction (FEC) encoding algorithm to generate error correction data therefor.

34. The network of claim 33 wherein said source node interleaves the data packets in rows such that each row includes data packets and the respective error correction data therefor.

35. The network of claim 34 wherein said source node distributes and sends the interleaved data packets and error correction data by dividing the rows thereof into a plurality of columns and sending the columns to said destination node across respective routes.

36. The network of claim 33 wherein the FEC encoding algorithm comprises a Reed-Solomon encoding algorithm, and wherein the error correction data comprises a respective Reed-Solomon codeword for each row.

37. The network of claim 33 wherein said source node inserts packet delimiters between the plurality of packets prior to encoding; and wherein said destination node extracts the data packets following decoding based upon the packet delimiters.

38. The network of claim 32 wherein the plurality of data packets comprise transport layer data packets; and wherein said source node distributes the interleaved transport layer data packets by grouping the interleaved transport layer data packets into a plurality of network layer packets.

39. The network of claim 38 wherein said source node generates respective network layer packet headers for each network layer packet, and wherein said destination node orders the network layer packets for deinterleaving based upon the network layer packet headers.

40. The network of claim 32 wherein said source node interleaves the data packets using at least one of block, convolutional, helical, and pseudorandom interleaving.

41. A method for communicating between a source node and a destination node in a mobile ad-hoc network (MANET) also comprising a plurality of intermediate nodes, the method comprising:
   establishing a plurality of routes from the source node to the destination node for transferring data therebetween, each route passing through at least one of the intermediate nodes;
   interleaving a plurality of data packets at the source node;
   distributing the interleaved data packets at the source node across the plurality of routes;
   concurrently sending different portions of the distributed interleaved data packets from the source node across the plurality of routes to the destination node;
   receiving the interleaved data packets via the plurality of routes at the destination node; and
   deinterleaving the data packets at the destination node.

42. The method of claim 41 further comprising encoding the data packets at the source node using a forward error correction (FEC) encoding algorithm to generate error correction data therefor prior to interleaving.

43. The method of claim 42 wherein interleaving comprises interleaving the data packets in rows such that each row includes respective error correction data therefor.

44. The method of claim 43 wherein distributing comprises dividing the rows of interleaved data packets and error correction data into a plurality of columns, and wherein sending comprises sending the columns to the destination node across respective routes.

45. The method of claim 42 wherein the FEC encoding algorithm comprises a Reed-Solomon encoding algorithm, and wherein the error correction data comprises a respective Reed-Solomon codeword for each row.

46. The method of claim 42 further comprising:
   inserting packet delimiters between the plurality of packets at the source node prior to encoding; and
   extracting the data packets at the destination node following decoding based upon the packet delimiters.

47. The method of claim 41 wherein the plurality of data packets comprise transport layer data packets; and wherein distributing comprises grouping the interleaved transport layer data packets into a plurality of network layer packets.

48. The method of claim 47 further comprising:
   generating respective network layer packet headers for each network layer packet at the source node; and
   ordering the network layer packets for deinterleaving at the destination node based upon the network layer packet headers.

49. The method of claim 41 wherein interleaving comprises interleaving the data packets using at least one of block, convolutional, helical, and pseudorandom interleaving.

50. The method of claim 41 wherein establishing comprises establishing the plurality of routes using a proactive MANET routing protocol.

51. The method of claim 41 wherein establishing comprises establishing the plurality of routes using a reactive MANET routing protocol.

\* \* \* \* \*

UNITED STATES PATENT AND TRADEMARK OFFICE
CERTIFICATE OF CORRECTION

PATENT NO.        : 7,216,282 B2
APPLICATION NO. : 10/369313
DATED             : May 8, 2007
INVENTOR(S)       : Cain It is certified that error appears in the above-identified patent and that said Letters Patent is hereby corrected as shown below:

Column 3, Line 43    Delete: "is schematic"
                     Insert -- is a schematic --

Column 8, Line 43    Delete: "not feasible"
                     Insert -- not be feasible --

Column 9, Line 31    Delete: "skilled"
                     Insert -- skilled in the art --

Column 10, Line 44   Delete: "EVIANET"
                     Insert -- MANET --

Signed and Sealed this

Eighteenth Day of September, 2007

JON W. DUDAS
*Director of the United States Patent and Trademark Office*